United States Patent
Wu (10) Patent No.: US 8,439,077 B2
(45) Date of Patent: May 14, 2013

(54) FAUCET OUTLET STRUCTURE

(76) Inventor: Gary Wu, Chang Hua (TW)

(*) Notice: Subject to any disclaimer, the term of this patent is extended or adjusted under 35 U.S.C. 154(b) by 130 days.

(21) Appl. No.: 13/187,105

(22) Filed: Jul. 20, 2011

(65) Prior Publication Data
US 2013/0019976 A1  Jan. 24, 2013

(51) Int. Cl.
*F16K 11/00* (2006.01)

(52) U.S. Cl.
USPC ........ 137/801; 137/603; 137/606; 137/315.2; 285/401; 285/402; 4/678

(58) Field of Classification Search ............ 137/801, 137/562, 603, 606, 315.12; 251/155; 285/401, 285/402; 4/678; 222/536
See application file for complete search history.

(56) References Cited

U.S. PATENT DOCUMENTS

| | | | | |
|---|---|---|---|---|
| 4,758,023 A * | 7/1988 | Vermillion | 285/7 |
| 5,165,121 A * | 11/1992 | McTargett et al. | 4/678 |
| 5,669,417 A * | 9/1997 | Lian-Jie | 137/801 |
| 5,924,451 A * | 7/1999 | Kuo | 137/801 |
| 6,256,810 B1 * | 7/2001 | Baker | 4/678 |
| 6,517,720 B1 * | 2/2003 | Aldred et al. | 210/282 |
| 6,530,682 B2 * | 3/2003 | Wu | 362/413 |
| 6,616,197 B2 * | 9/2003 | Sampson | 285/376 |
| 6,925,686 B2 * | 8/2005 | Heathcock et al. | 16/429 |
| 7,017,953 B2 * | 3/2006 | Benscoter et al. | 285/401 |
| 7,399,000 B2 * | 7/2008 | Lee | 285/7 |
| 7,401,820 B2 * | 7/2008 | Niki | 285/376 |
| 8,156,963 B2 * | 4/2012 | Lopp et al. | 137/801 |
| 2005/0098221 A1 * | 5/2005 | Mascari et al. | 137/801 |
| 2008/0289709 A1 * | 11/2008 | Pinette | 137/801 |
| 2009/0078325 A1 * | 3/2009 | Lin | 137/801 |
| 2009/0260153 A1 * | 10/2009 | Thomas | 4/677 |
| 2010/0071778 A1 * | 3/2010 | Nelson et al. | 137/15.01 |
| 2010/0139796 A1 * | 6/2010 | DeVries et al. | 137/801 |
| 2010/0212086 A1 * | 8/2010 | Chang | 4/676 |
| 2011/0073205 A1 * | 3/2011 | Marty et al. | 137/801 |
| 2011/0079307 A1 * | 4/2011 | Marty et al. | 137/801 |
| 2011/0148107 A1 * | 6/2011 | Blivet | 285/402 |
| 2011/0186146 A1 * | 8/2011 | Guan | 137/315.01 |
| 2012/0097279 A1 * | 4/2012 | Ko et al. | 137/801 |
| 2012/0186768 A1 * | 7/2012 | Sun et al. | 164/23 |

\* cited by examiner

*Primary Examiner* — John Rivell
*Assistant Examiner* — Minh Le
(74) *Attorney, Agent, or Firm* — Che-Yang Chen; Law Office of Michael Chen (57) ABSTRACT

A faucet outlet structure includes a faucet base, an outlet pipe and two outlet ducts. The outlet pipe is made by zinc alloy using die-casting processing method to form in one piece, and the two outlet ducts are made by plastics and engaged with each other. Each engaging portion has a connecting portion, wherein a protruding edge of the first connecting portion of the first outlet duct has a through restricting hole, and a through slot is diagonally and recessedly formed at the opening of two protruding edges and the through slot and the restricting hole are connected perpendicularly. The second connecting portion has a block protrudingly on both sides and the block is engaged with the restricting hole of the first outlet duct. According to the abovementioned structure, two outlet ducts penetrate through both sides of the outlet pipe, align to engage and then turn, so the two outlet ducts can be fast, easily and securely positioned at the bended outlet pipe. Also, the outlet pipe is made of zinc alloys using die-casting processing method to form in one piece, so the process is fast and the surface is relatively fine.

9 Claims, 8 Drawing Sheets

FAUCET OUTLET STRUCTURE

FIELD OF THE INVENTION

The present invention is related to a "faucet outlet structure", and more specifically to two outlet ducts penetrating through both sides of an outlet pipe, aligning to engage and then rotating, so the two outlet ducts can be easily and securely positioned at the outlet pipe with a bended shape to achieve the goal of fast and easy assembly. On the other hand, the outlet pipe is made of zinc alloys using die-casting processing method to form in one piece, so the process is fast and the surface is relatively fine. Also, the faucet manufacturing process is simplified and the manufacturing time is shortened to significantly lower the manufacturing costs.

BACKGROUND OF THE INVENTION

Generally, adding lead in copper materials would facilitate manufacturing and casting process, so it is widely used for manufacturing faucet structure. However, in recent years, since the price of copper continues to rise and the addition of lead is strictly regulated by law, the processing and material costs of faucets continue to increase. Therefore, the faucet manufacturers gradually shift to use zinc alloy as an alternative material, which is cheaper and easy for surface processing to achieve cost saving in raw materials and processing. However, zinc alloy becomes easy to peel after exposing to water due to oxidation. So, in most faucet structure, a plastic inner tube is disposed to avoid zinc alloy from directly contacting with water to cause oxidation. But, because conventional water outlet duct of the plastic tube has an angle of double concave, it is difficult for the process of injection molding, as well as assembling the structure of the outlet pipe at the faucet, which may reduce the production rate of the faucet. Therefore, there remains a need to develop a water outlet duct that can be fast assembled and easy for injection molding process to substantially increase the efficiency in faucet production and achieve the goal of lowering manufacturing costs.

SUMMARY OF THE INVENTION

The technical problem to be solved in the present invention is that conventional water outlet duct of the plastic tube has an angle of double concave, which is difficult for the process of injection molding, as well as assembling the structure of the outlet pipe at the faucet. Furthermore, it may reduce the production rate of the faucet. This is the problem the inventor would like to solve.

The technical point to solve the problem mentioned above is that the present invention provides a faucet outlet structure including: a faucet base having a water outlet on a top surface, an outlet pipe made by zinc alloy using die-casting processing method to form in one piece. The outlet pipe has a receiving channel, one downward end of which has an inserting end formed at the periphery of the water outlet of the faucet base, and the other end of the receiving channel is bended down and extended to form a water outlet channel. The faucet base also has a first outlet duct and a second outlet duct made by plastic materials and located at the receiving channel and the water outlet channel of the outlet pipe respectively, wherein one downward end of the first outlet duct has a connecting duct inserted in the water outlet of the faucet base. Two outlet ducts are connected by engaging with each other, and a first connecting portion and a second connecting portion are formed on each side of an engaging portion of the two outlet ducts. The second outlet duct and its connecting portion are connected in a roughly perpendicular manner, wherein the first connecting portion forms a protruding edge at both sides of the opening, and the protruding edge has a through restricting hole. A through slot is diagonally and recessedly formed at the opening of two protruding edges and the through slot and the restricting hole are connected perpendicularly. A block is protrudingly formed on both sides of the second connecting portion and the block is engaging with the restricting hole of first connecting portion.

Comparing with conventional techniques, the faucet outlet structure in the present invention has the following advantages: (1) the first and second outlet ducts penetrate through both sides of the outlet pipe, align to engage and then turn, so the two outlet ducts can be easily and securely positioned at the outlet pipe with a bended shape to achieve the goal of fast and easy assembly and to further increase the efficiency in faucet production and reduce the manufacturing costs; and (2) the outlet pipe is made of zinc alloys using die-casting processing method to form in one piece, so the process is fast and the surface is relatively fine, and the manufacturing process is further simplified and the manufacturing time is shortened to significantly lower the manufacturing costs.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
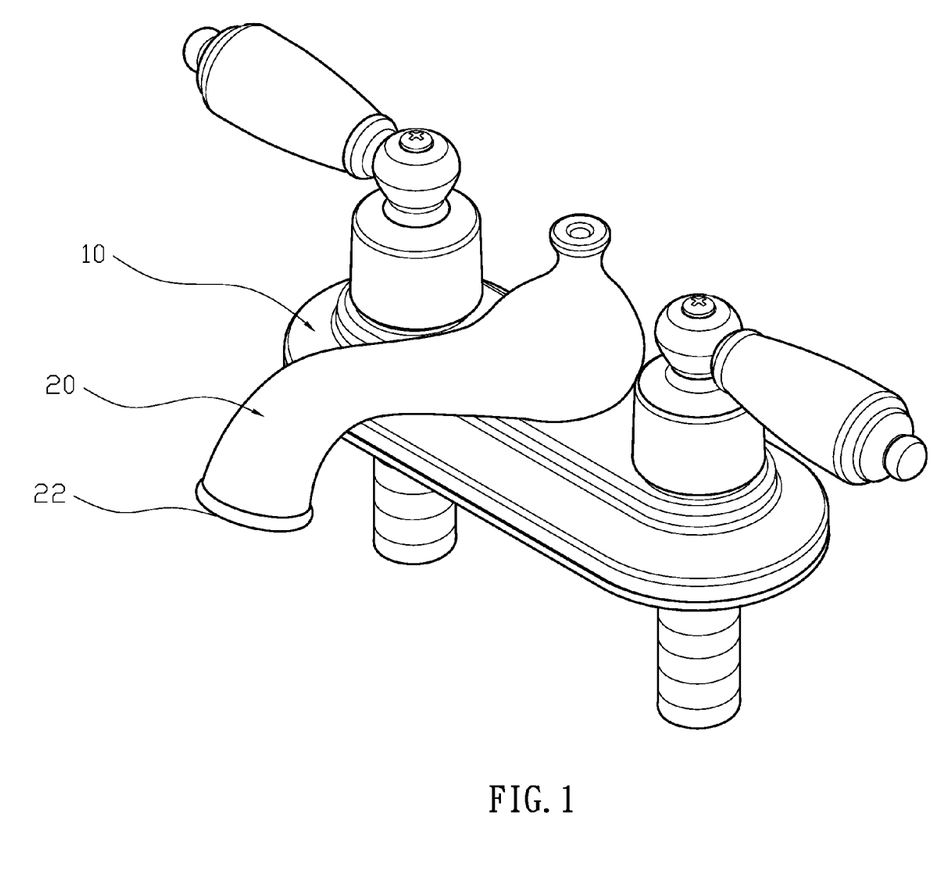
FIG. 1 illustrates a three-dimensional assembled view in the present invention.
Figure 2:
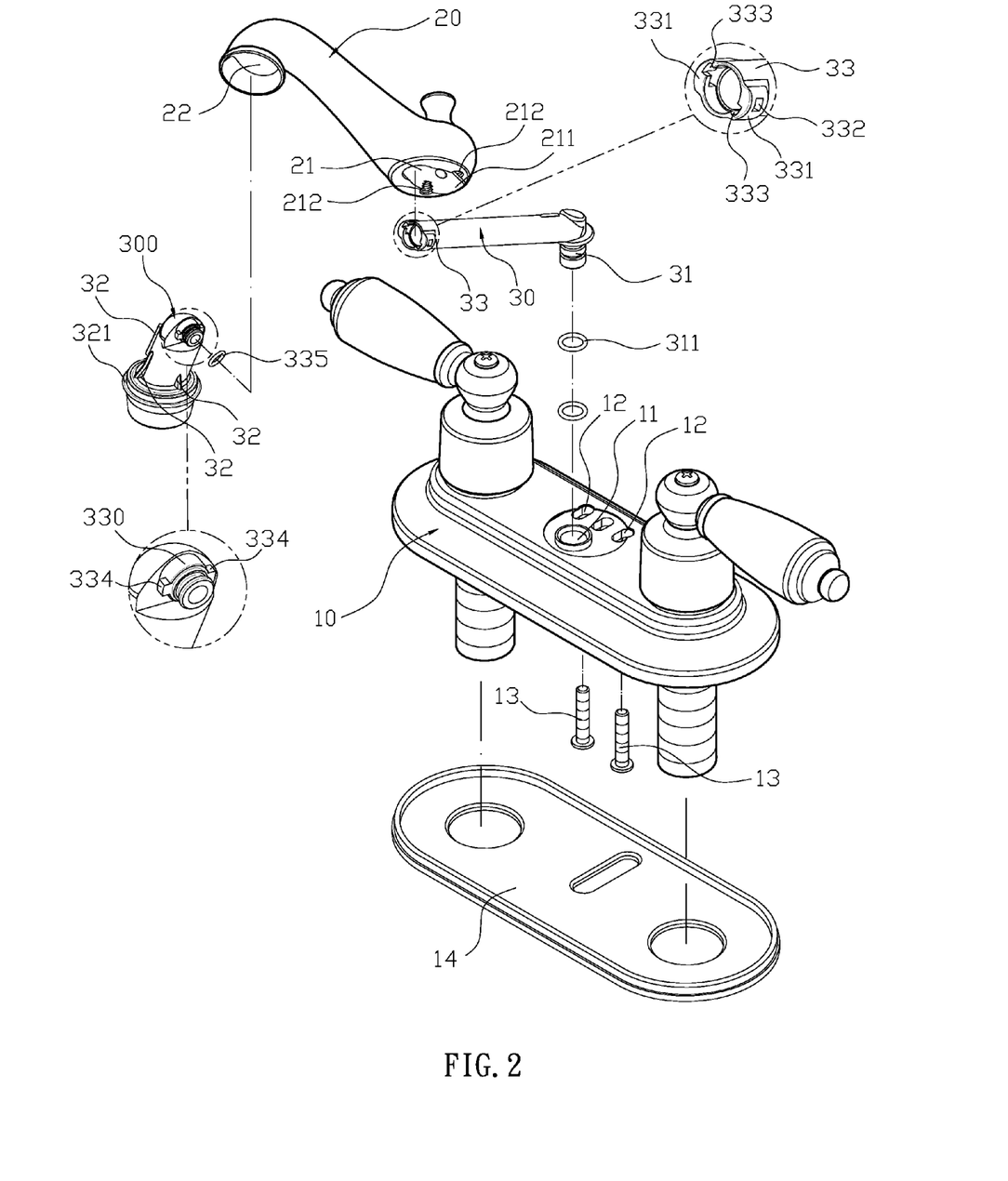
FIG. 2 illustrates a three-dimensional exploded view in the present invention.
Figure 8:
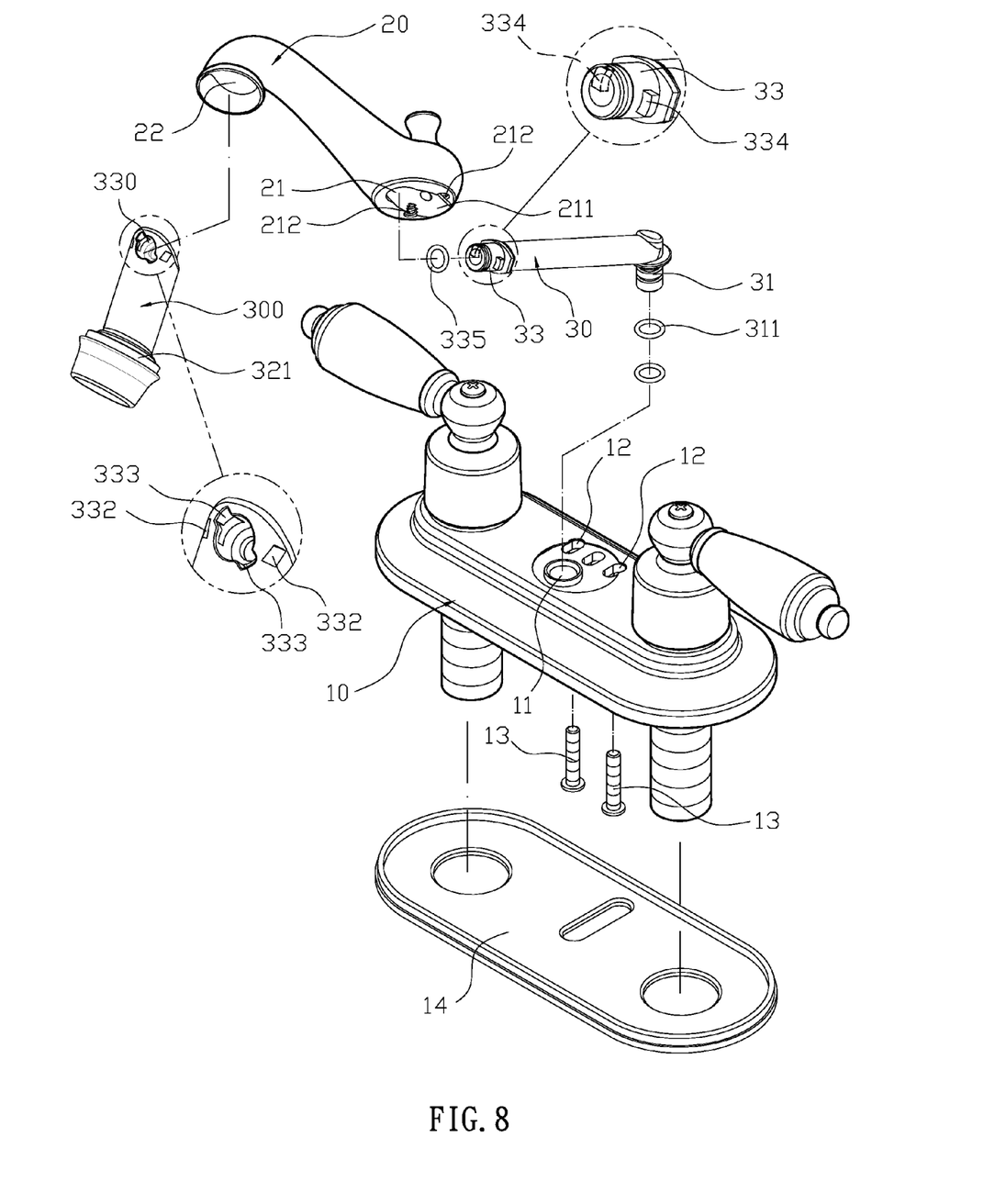
FIG. 8 illustrates a three-dimensional exploded view of another embodiment in the present invention.

In order to further understand the goal, characteristics and effect of the present invention, a number of embodiments along with the drawings are illustrated as following:

Referring to FIGS. 1 to 2, a faucet outlet structure includes: a faucet base (10), an outlet pipe (20), a first outlet duct (30) and a second outlet duct (300), wherein the faucet base (10) has a water outlet (11) on a top surface thereof and two through holes (12) through and adjacent to the water outlet (11). The through holes (12) provide a lock unit (13), and a bottom surface of the faucet base (10) is covered by a bottom cover (14). The outlet pipe (20) is made by zinc alloy using die-casting processing method to form in one piece, wherein the outlet pipe (20) has a receiving channel (21), one downward end of which has an inserting end (211) having a connecting slot (212) recessedly formed at each side of the inserting end (211), and the connecting slot (212) is provided to lock the lock unit (13) of the faucet base (10). The other end of the receiving channel (21) is bended down and extended to form a water outlet channel (22). Two outlet ducts (30) (300) are made by plastic materials and located at the receiving channel (21) and the water outlet channel (22) of the outlet pipe (20) respectively, wherein one downward end of the first outlet duct (30) has a connecting duct (31) having a number of peripheral sealing gaskets (311), and the connection duct (31) is inserted into the water outlet (11) of the faucet base (10). The second outlet duct (300) has a number of positioning ribs (32) equaldistantly located at the periphery of the second outlet duct (300), wherein the positioning rib (32) is located at inner periphery of the water outlet channel (22) of the outlet pipe (20), and an supporting edge (321), which is used to be against the edge of the water outlet channel (22) of the outlet pipe (20), is protrudingly formed adjacent to the positioning rib (32). Two outlet ducts (30) (300) are connected by engaging with each other, and a first connecting portion (33) and a second connecting portion (330) are formed on each side of an engaging portion of the two outlet ducts. The second outlet duct (300) and its connecting portion (330) are connected in a roughly perpendicular manner. In this embodiment, the first connecting portion (33) forms a protruding edge (331) at both sides of the opening, and the protruding edge (331) has a through restricting hole (332). A through slot (333) is diagonally and recessedly formed at the opening of two protruding edges (331), and the through slot (333) and the restricting hole (332) are connected perpendicularly. A block (334) is protrudingly formed on both sides of the second connecting portion (330) and the block (334) is engaging with the restricting hole (332) of the first connecting portion (33). A second sealing gasket (335) is formed near the block (334). In another embodiment (see FIG. 8), the first outlet ducts (30) and the second outlet duct (300), and their connecting portions (33) (330) are interchangeable to achieve the same connecting effect.

Figure 3:
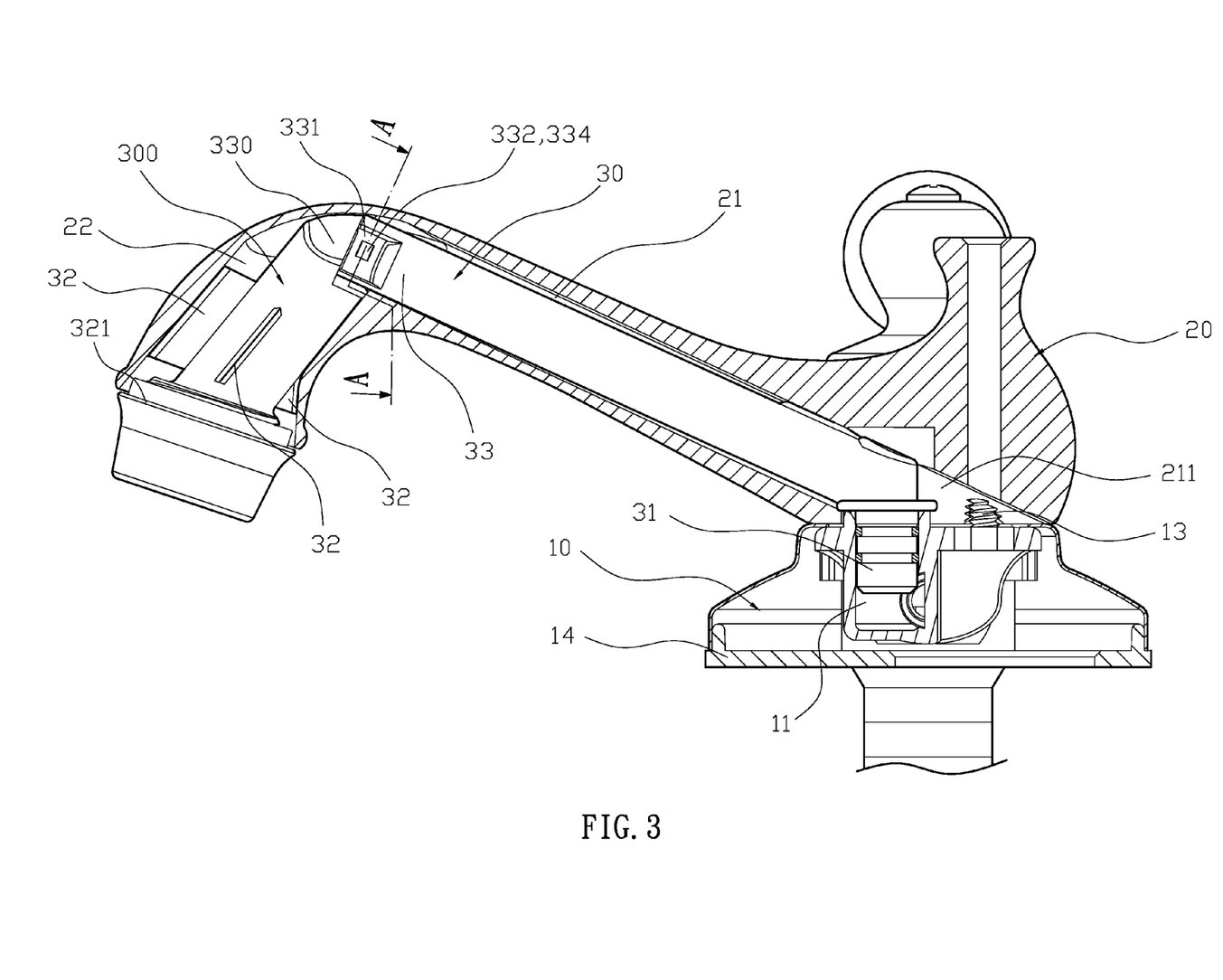
FIG. 3 illustrates a schematic sectional view in the present invention.
Figure 4:
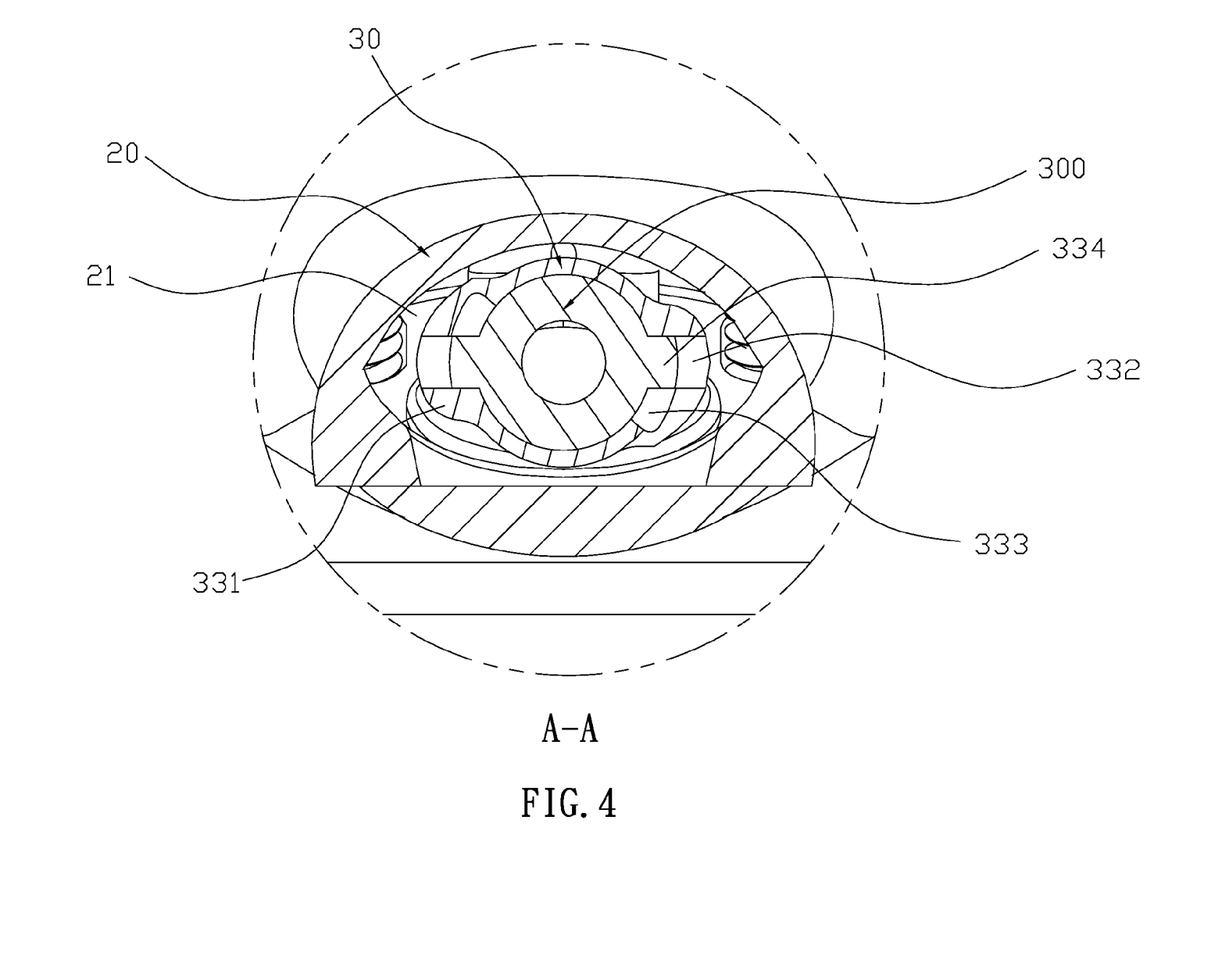
FIG. 4 illustrates a schematic sectional view of FIG. 3 along A-A section in the present invention.
Figure 5:
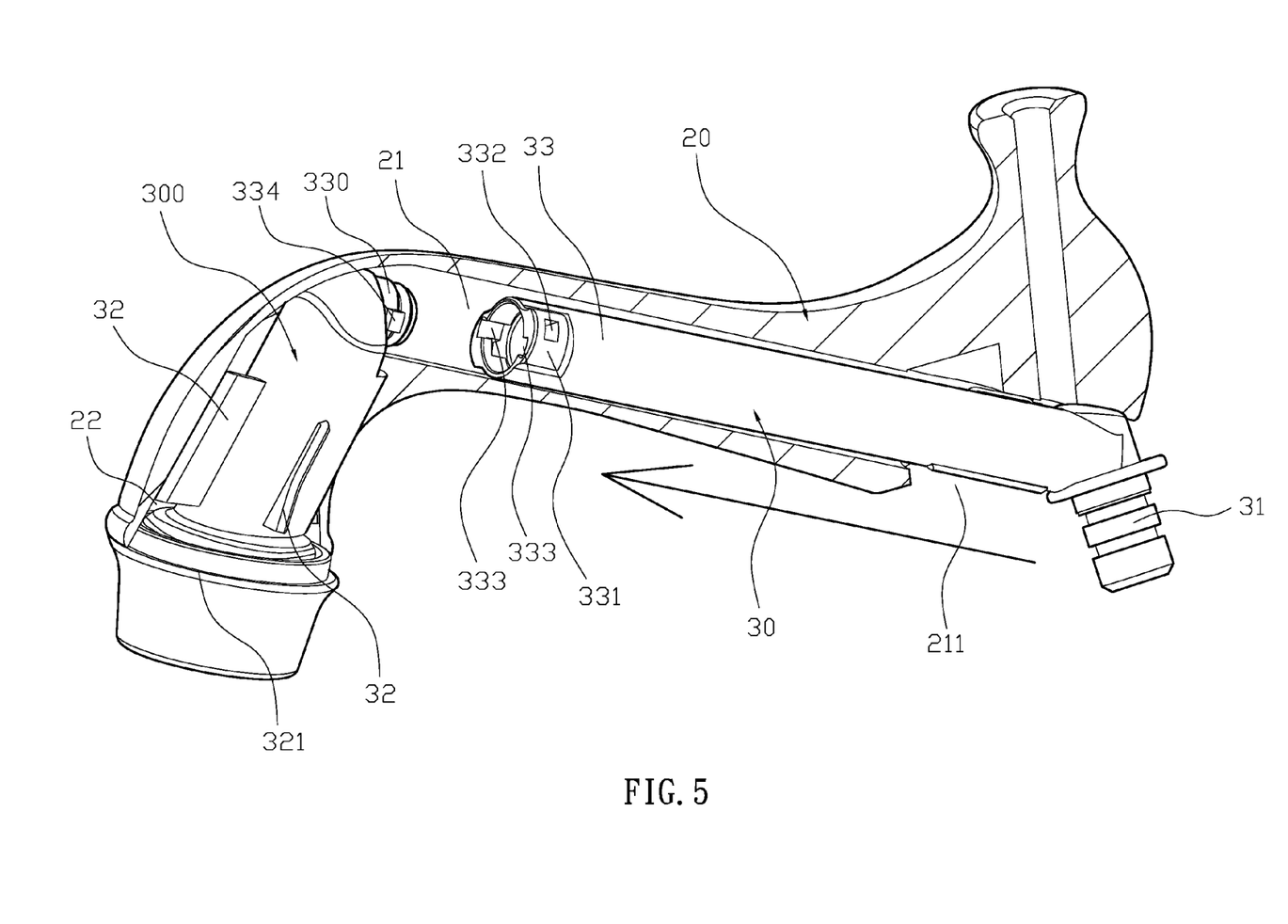
FIG. 5 illustrates a schematic view of assembling two outlet ducts in the outlet pipe in the present invention.
Figure 6:
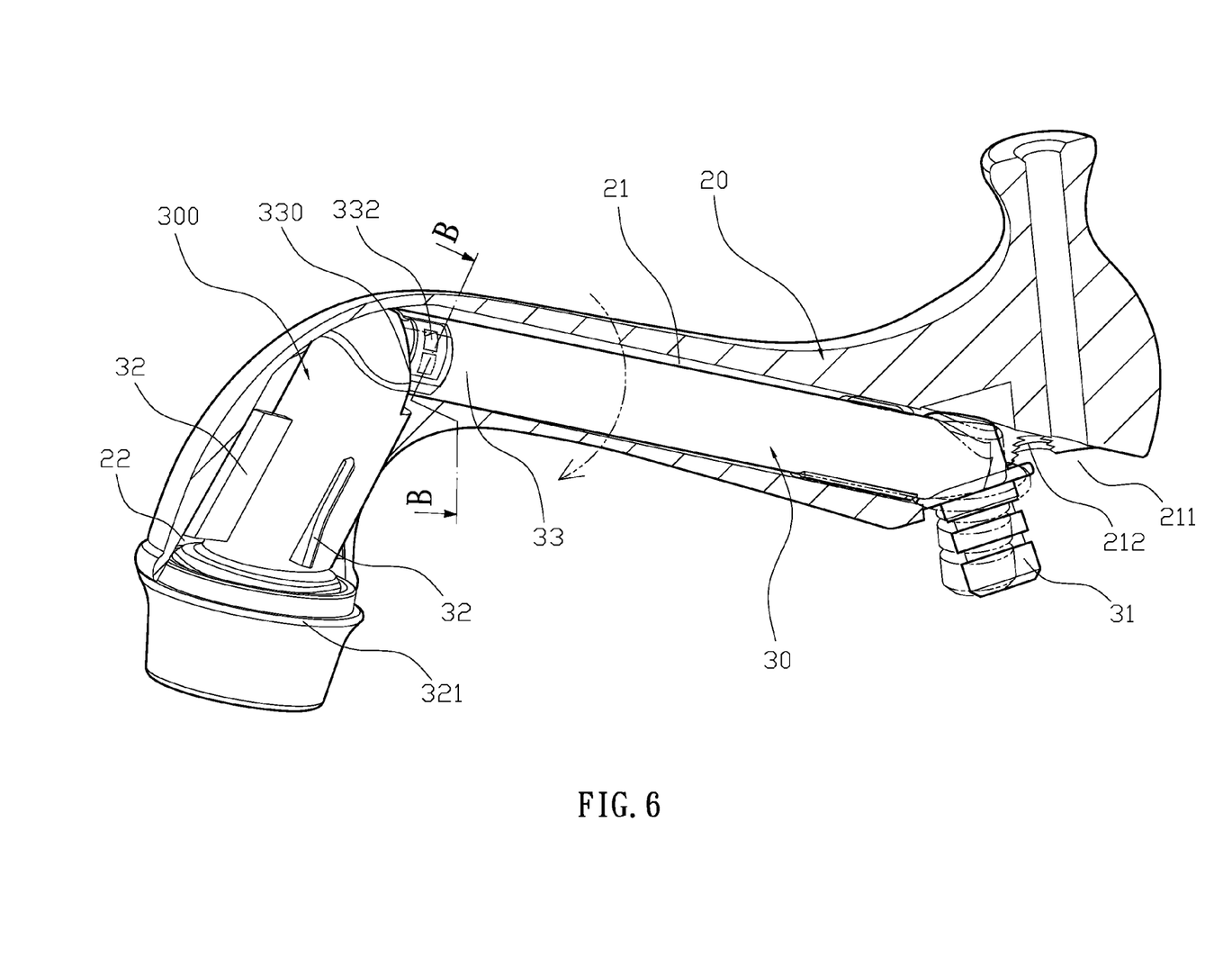
FIG. 6 illustrates another schematic view of assembling two outlet ducts in the outlet pipe in the present invention.
Figure 7:
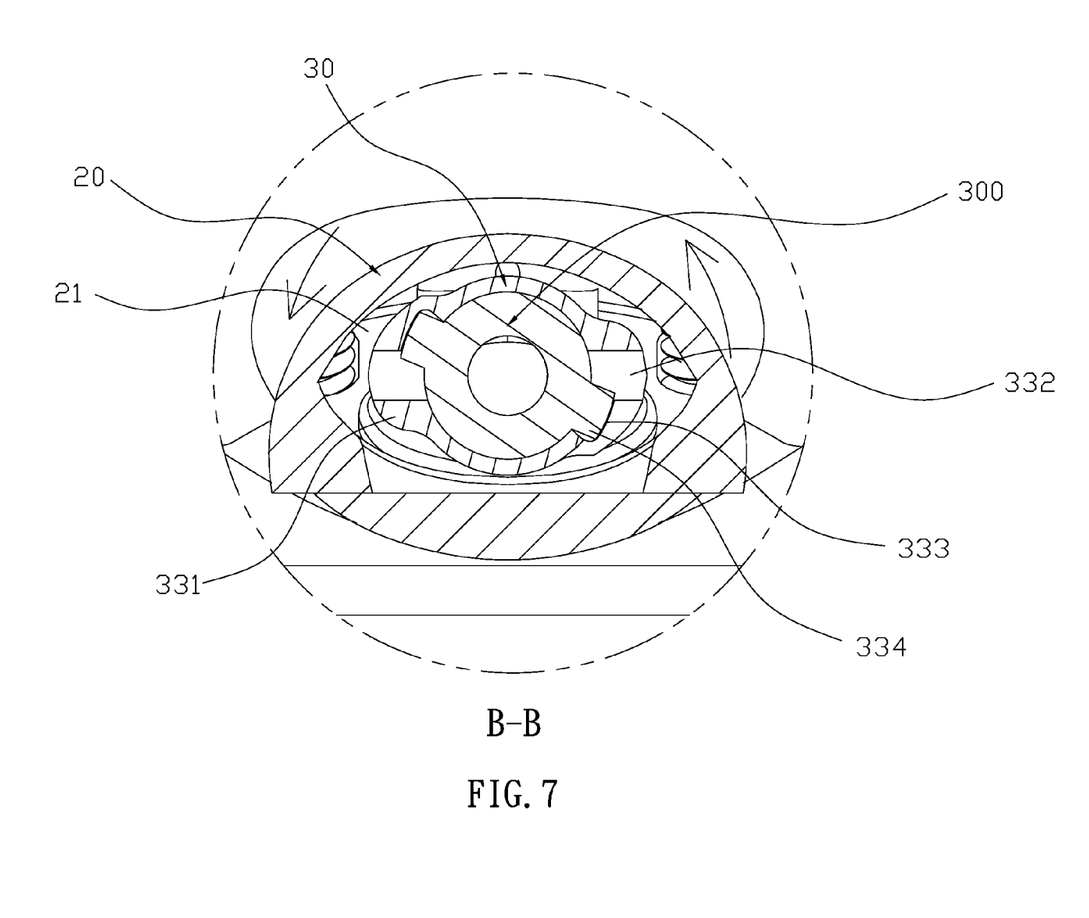
FIG. 7 illustrates a schematic sectional view of FIG. 6 along B-B section in the present invention.

Referring to FIGS. 3 and 4 for the assembly of the structure, the second outlet duct (300) is inserted through the water outlet channel (22) of the outlet pipe (20) via the second connecting portion (330), so that the positioning ribs (32) of the second outlet duct (300) can be against the inner periphery of the water outlet channel (22) and the supporting edge (321) of the positioning rib (32) is against the opening edge of the water outlet channel (22) to form a secure position. Furthermore, the first outlet duct (30) is inserted through the receiving channel (21) of the outlet pipe (20) from the inserting end (211), and the first outlet duct (30) is turned to press and align the through slot (333) with the block (334) of the second outlet duct (300) (see FIG. 5 as well), so that the block (334) holds the first connecting portion (33) open and the block (334) is then pushed to a corner of the through slot (333) to engage the block (334) with the restricting hole (332) by reversely turning the first outlet duct (30) (see FIGS. 6 and 7 as well). Meanwhile, the first connecting portion (33) of the first outlet duct (30) is restored to constrict the second outlet duct (300). The first outlet duct (30) is then plugged into the water outlet (11) of the faucet base (10) through the connecting duct (31), and the lock unit (13) penetrates through the through hole (12) of the faucet base (10) and locks at the connecting slot (212) of the outlet pipe (20). Finally, the bottom cover (14) covers the underneath of the faucet base (10) to complete the assembly. The first (30) and second (300) outlet ducts penetrate through both sides of the outlet pipe (20), align to engage and then turn, so the two outlet ducts (30) (300) can be easily and securely positioned at the outlet pipe (20) with a bended shape to achieve the goal of fast and easy assembly. When the user wants to disassemble two outlet ducts (30) (300), the user only needs to reversely rotate the first outlet duct (30) and pull it out with force to achieve the goal of disassembling the outlet ducts (30) (300) in a fast and easy manner.

According to the structure shown in the embodiments, the present invention has the following advantages: (1) the first and second outlet ducts (30) (300) penetrate through both sides of the outlet pipe (20), align to engage and then turn, so the two outlet ducts (30) (300) can be easily and securely positioned at the outlet pipe (20) with a bended shape to achieve the goal of fast and easy assembly; (2) the outlet pipe is made of zinc alloys using die-casting processing method to form in one piece, so the process is fast and the surface is relatively fine, and the manufacturing process is further simplified and the manufacturing time is shortened to significantly lower the manufacturing costs and increase the efficiency of manufacturing the faucets.

Having described the invention by the description and illustrations above, it should be understood that these are exemplary of the invention and are not to be considered as limiting. Accordingly, the invention is not to be considered as limited by the foregoing description, but includes any equivalent

What is claimed is:

1. A faucet outlet structure comprising:
   a faucet base having a water outlet on a top surface thereof;
   an outlet pipe made by zinc alloy using die-casting processing method to form in one piece, wherein the outlet pipe has a receiving channel, one downward end of which has an inserting end formed at the periphery of the water outlet of the faucet base, and the other end of the receiving channel is bended down and extended to form a water outlet channel; and
   a first non-flexible outlet duct and a second non-flexible outlet duct made by plastic materials and located at the receiving channel and the water outlet channel of the outlet pipe respectively, wherein one downward end of the first outlet duct has a connecting duct inserted in the water outlet of the faucet base, and the two outlet ducts are connected by engaging with each other, wherein a first connecting portion and a second connecting portion are formed on each side of an engaging portion of the two outlet ducts, and the second outlet duct and its connecting portion are connected in a roughly perpendicular manner, wherein the first connecting portion forms a protruding edge at both sides of an opening of the engagement portion of the first outlet duct, and the protruding edge has a through restricting hole, wherein a through slot is diagonally and recessedly formed at the opening of two protruding edges and the through slot and the restricting hole are connected perpendicularly, and wherein a block is protrudingly formed on both sides of the second connecting portion and the block is engaging with the restricting hole of first connecting portion.

2. The faucet outlet structure of claim 1, wherein the faucet base includes two through holes through and adjacent to the water outlet, and the through holes provide a lock unit to lock a connecting slot recessedly formed on both sides of the inserting end of the outlet pipe.

3. The faucet outlet structure of claim 1, wherein the faucet base has a bottom cover to cover the underneath of the faucet base.

4. The faucet outlet structure of claim 1, wherein the connecting duct has a plurality of sealing gaskets.

5. The faucet outlet structure of claim 1, wherein the second outlet duct has a number of positioning rib located at the periphery of the second outlet duct, and the positioning rib is located at inner periphery of the water outlet channel of the outlet pipe.

6. The faucet outlet structure of claim 5, wherein the positioning ribs are equaldistantly distributed.

7. The faucet outlet structure of claim 5, wherein an supporting edge, which is used to be against an edge of the water outlet channel of the outlet pipe, is protrudingly formed adjacent to the positioning rib.

8. The faucet outlet structure of claim 1, wherein a second sealing gasket is disposed near the block of the second connecting portion.

9. The faucet outlet structure of claim 1, wherein the two outlet ducts and the connecting portions thereof are interchangeable.

* * * * *